United States Patent
Barath et al.

(10) Patent No.: US 10,330,197 B2
(45) Date of Patent: Jun. 25, 2019

(54) CONTINUOUSLY VARIABLE TRANSMISSION AND SYSTEM AND METHOD OF CONTROL FOR HIGH TORQUE EVENTS

(71) Applicant: GM GLOBAL TECHNOLOGY OPERATIONS LLC, Detroit, MI (US)

(72) Inventors: Alexander S Barath, Brighton, MI (US); Crystal J Nassouri, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 344 days.

(21) Appl. No.: 15/256,808

(22) Filed: Sep. 6, 2016

(65) Prior Publication Data

US 2018/0065639 A1    Mar. 8, 2018

(51) Int. Cl.
| | |
|---|---|
| *F16H 61/662* | (2006.01) |
| *B60W 10/06* | (2006.01) |
| *B60W 10/107* | (2012.01) |
| *B60W 30/18* | (2012.01) |

(52) U.S. Cl.
CPC ....... *F16H 61/66272* (2013.01); *B60W 10/06* (2013.01); *B60W 10/107* (2013.01); *B60W 30/18172* (2013.01); *B60W 2510/0638* (2013.01); *B60W 2510/1025* (2013.01); *B60W 2510/1045* (2013.01); *B60W 2520/10* (2013.01);
(Continued)

(58) Field of Classification Search
CPC ............. F16H 61/662; F16H 61/66272; F16H 2061/66277
See application file for complete search history.

(56) References Cited

U.S. PATENT DOCUMENTS

| | | |
|---|---|---|
| 7,188,717 B2 | 3/2007 | Hoshiya et al. |
| 7,666,110 B2 | 2/2010 | Iwatsuki et al. |
| (Continued) | | |

OTHER PUBLICATIONS

US Application Filing date Jan. 25, 2016; U.S. Appl. No. 15/005,293, Applicant: GM Global Technology Operations LLC; Title: System and Method for Calculating Vehicle Speed and Controlling a Continuously Variable Transmission.
(Continued)

*Primary Examiner* — Erin D Bishop

(57) ABSTRACT

A continuously variable transmission (CVT), a transmission control system, and a method vary CVT clamping pressure based on an operation parameter. The control system is configured to command an initial minimum clamping pressure to be applied to the variator assembly to achieve a desired torque capacity. The control system determines one or more vehicle operation parameters and determines a vehicle condition based on the vehicle operation parameter(s). The vehicle condition is selectable from at least a base condition, an elevated condition, and a high condition. The control system selects a compensation strategy based on the vehicle condition. If an elevated compensation strategy has been selected and a predetermined condition has been met, the control system commands an elevated clamping pressure to be applied to the variator assembly. If a high compensation strategy has been selected, the control system commands a high clamping pressure to be applied to the variator assembly.

25 Claims, 4 Drawing Sheets

(52) U.S. Cl.
CPC . *B60W 2520/105* (2013.01); *B60W 2520/125* (2013.01); *B60W 2520/26* (2013.01); *B60W 2540/10* (2013.01); *F16H 2061/66277* (2013.01)

(56) References Cited

U.S. PATENT DOCUMENTS

| | | | |
|---|---|---|---|
| 7,765,048 | B2 | 7/2010 | Suzuki et al. |
| 7,917,272 | B2 | 3/2011 | Suzuki et al. |
| 8,010,266 | B2 | 8/2011 | Lee |
| 8,594,898 | B2 | 11/2013 | Totsuka |
| 8,738,246 | B2 | 5/2014 | Takemori et al. |
| 8,924,104 | B2 * | 12/2014 | Natori ............... F16H 61/66272 701/51 |
| 9,151,382 | B2 | 10/2015 | Zhang et al. |
| 9,482,339 | B2 | 11/2016 | Nohara et al. |
| 9,534,685 | B2 * | 1/2017 | Yagasaki ........... F16H 61/66272 |
| 2006/0172829 | A1 * | 8/2006 | Ishio .................. F16H 61/0021 474/18 |
| 2015/0345631 | A1 | 12/2015 | Zhang et al. |

OTHER PUBLICATIONS

US Application Filing date Aug. 23, 2016; U.S. Appl. No. 15/244,760, Applicant: GM Global Technology Operations LLC; Title: Continuously Variable Transmission and System and Method of Control Based on a Zeroed-Out Wheel Slip.

US Application Filing date Nov. 18, 2015; U.S. Appl. No. 14/944,459, Applicant: GM Global Technology Operations LLC; Title: Method and Apparatus to Control a Continuously Variable Transmission.

US Application Filing date Nov. 18, 2015; U.S. Appl. No. 14/944,680, Applicant: GM Global Technology Operations LLC; Title: Method and Apparatus to Control a Continuously Variable Transmission.

US Application Filing date Nov. 9, 2015; U.S. Appl. No. 14/935,580, Applicant: GM Global Technology Operations LLC; Title: Method and Apparatus to Control a Continuously Variable Transmission.

US Application Filing date Nov. 18, 2015; U.S. Appl. No. 14/944,680, Applicant: GM Global Technology Operations LLC; Title: Transmission Ratio Control Systems and Methods.

US Application Filing date Nov. 9, 2015; U.S. Appl. No. 14/935,575, Applicant: GM Global Technology Operations LLC; Title: Method and Apparatus to Control a Continuously Variable Transmission.

US Application Filing date Oct. 19, 2015; U.S. Appl. No. 14/886,366, Applicant: GM Global Technology Operations LLC; Title: Method and Apparatus to Control a Continuously Variable Transmission.

US Application Filing date Jun. 7, 2016; U.S. Appl. No. 15/175,350, Applicant: GM Global Technology Operations LLC; Title: Real-Time Driver-Controlled Dynamic Vehicle Balance Control System.

* cited by examiner

CONTINUOUSLY VARIABLE TRANSMISSION AND SYSTEM AND METHOD OF CONTROL FOR HIGH TORQUE EVENTS

TECHNICAL FIELD

The present disclosure pertains to a continuously variable transmission (CVT), a transmission control system, and a method for controlling the CVT.

INTRODUCTION

A continuously variable transmission (CVT) is a type of power transmission that is capable of continuously changing an output/input speed ratio over a range between a minimum (underdrive) ratio and a maximum (overdrive) ratio, thus permitting an infinitely variable selection of engine operation that can achieve a preferred balance of fuel consumption and engine performance in response to an output torque request. Unlike conventionally-geared transmissions that use one or more planetary gear sets and multiple rotating and braking friction clutches to establish a discrete gear state, a CVT uses a variable-diameter pulley system to achieve the infinitely variable selection of gear ratios.

The pulley system, which is commonly referred to as a variator assembly, can transition anywhere within the calibrated range of speed ratios. A typical belt-type or chain-type variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and an input gear set, and thus acts as a driving/primary pulley. The other pulley is connected via additional gear sets to an output shaft of the CVT and thus acts as a driven/secondary pulley. One or more planetary gear sets may be used on the input or output sides of the variator assembly, depending on the configuration.

In order to vary a CVT speed ratio and to transfer torque to the drivetrain, a clamping force (applied through hydraulic pressure) may be applied to one or both of the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This, in turn, changes the effective diameters of the variator pulleys and may vary the speed ratio of the CVT. A clamping force may also applied to transfer a desired amount of torque from one pulley to another through the continuous member, where the amount of clamping force applied is intended to prevent the continuous member from slipping on the pulleys.

A CVT control system can be programmed to respond to outside events, such as wheel slip or other events that create the need for a high torque carrying capacity by the CVT continuous member. For example, when the wheels are slipping, this may be an indication that the variator assembly will soon require additional torque carrying capacity due to a spike or disturbance in output torque. Accordingly, a CVT control system may apply a maximum clamping pressure to the CVT pulleys when detecting wheel slip, to prevent the continuous member from slipping. Such maximum clamping pressure, however, has a negative effect on fuel economy.

SUMMARY

The present disclosure provides a control system that adjusts the amount of clamping force depending on the magnitude of the torque disturbance.

In one form, which may be combined with or separate from the other forms disclosed herein, a method for controlling a continuously variable transmission (CVT) including a variator assembly for a motor vehicle is provided. The method includes steps of commanding an initial minimum clamping pressure to be applied to the variator assembly to achieve a desired torque capacity, determining at least one vehicle operation parameter, and determining a vehicle condition based on the at least one vehicle operation parameter. The vehicle condition is selectable from at least a base condition, an elevated condition, and a high condition. The method also includes a step of selecting a compensation strategy based on the vehicle condition, where the compensation strategy is selectable from at least a base compensation strategy, an elevated compensation strategy, and a high compensation strategy. The base compensation strategy is selected when the base condition has been determined, the elevated compensation strategy is selected when the elevated condition has been determined, and the high compensation strategy is selected when the high condition has been determined. The method includes commanding an elevated clamping pressure to be applied to the variator assembly if the elevated compensation strategy has been selected and a predetermined condition has been met. The method includes commanding a high clamping pressure to be applied to the variator assembly if the high compensation strategy has been selected.

In another form, which may be combined with or separate from the other forms disclosed herein, a transmission control system for controlling a continuously variable transmission (CVT) having a variator assembly is provided. The transmission control system includes an instruction set, the instruction set executable to: command an initial minimum clamping pressure to be applied to the variator assembly to achieve a desired torque capacity; determine at least one vehicle operation parameter; determine a vehicle condition based on the vehicle operation parameter(s), the vehicle condition being selectable from at least a base condition, an elevated condition, and a high condition; select a compensation strategy based on the vehicle condition, the compensation strategy being selectable from at least a base compensation strategy, an elevated compensation strategy, and a high compensation strategy, the base compensation strategy being selected when the base condition has been determined, the elevated compensation strategy being selected when the elevated condition has been determined, and the high compensation strategy being selected when the high condition has been determined; if the elevated compensation strategy has been selected and a predetermined condition has been met, command an elevated clamping pressure to be applied to the variator assembly; and if the high compensation strategy has been selected, command a high clamping pressure to be applied to the variator assembly.

In yet another form, which may be combined with or separate from the other forms disclosed herein, a transmission controller for controlling a continuously variable transmission (CVT) having a variator assembly is provided. The transmission controller has a first control logic configured to command an initial minimum clamping pressure to be applied to the variator assembly to achieve a desired torque capacity and a second control logic configured to determine at least one vehicle operation parameter. The transmission controller also includes a third control logic configured to determine a vehicle condition based on the vehicle operation parameter(s), where the vehicle condition is selectable from at least a base condition, an elevated condition, and a high condition. The transmission controller includes a fourth control logic configured to select a compensation strategy based on the vehicle condition. The compensation strategy is selectable from at least a base compensation strategy, an elevated compensation strategy, and a high compensation strategy. The base compensation strategy is selected when the base condition has been determined, the elevated compensation strategy is selected when the elevated condition has been determined, and the high compensation strategy is selected when the high condition has been determined. The transmission controller further includes a fifth control logic configured to command an elevated clamping pressure to be applied to the variator assembly if the elevated compensation strategy has been selected and a predetermined condition has been met, and the transmission controller includes a sixth control logic configured to command a high clamping pressure to be applied to the variator assembly if the high compensation strategy has been selected.

In still another form, which may be combined with or separate from the other forms disclosed herein, a continuously variable transmission (CVT) for a motor vehicle is provided. The CVT includes a variator assembly including a first pulley and a second pulley. The first and second pulleys are rotatably coupled by a continuous rotatable device, wherein the first pulley is rotatably coupled to an input member and the second pulley is rotatably coupled to an output member. The first pulley includes a first moveable sheave that is translatable along a first axis relative to a first stationary sheave in response to urging of a first actuator. The second pulley includes a second moveable sheave that is translatable along a second axis relative to a second stationary sheave in response to urging of a second actuator. The CVT includes a control system having at least one controller and one or more sensors in communication with the controller.

The control system of the CVT includes an instruction set, wherein the instruction set is executable to: command an initial minimum clamping pressure to be applied to the variator assembly to achieve a desired torque capacity; determine at least one vehicle operation parameter; determine a vehicle condition based on the vehicle operation parameter(s), the vehicle condition being selectable from at least a base condition, an elevated condition, and a high condition; select a compensation strategy based on the vehicle condition, the compensation strategy being selectable from at least a base compensation strategy, an elevated compensation strategy, and a high compensation strategy, the base compensation strategy being selected when the base condition has been determined, the elevated compensation strategy being selected when the elevated condition has been determined, and the high compensation strategy being selected when the high condition has been determined; if the elevated compensation strategy has been selected and a predetermined condition has been met, command an elevated clamping pressure to be applied to the variator assembly; and if the high compensation strategy has been selected, command a high clamping pressure to be applied to the variator assembly.

Additional features may optionally be included with the disclosed method, controller, control system, and/or CVT, such as: the method or controller/control system/CVT being configured to, or having a control logic to, command the initial minimum clamping pressure to be applied to the variator assembly if the base compensation strategy has been selected; the method or controller/control system/CVT being configured to, or having a control logic to, activate a timer if the elevated condition is determined, wherein in the elevated compensation strategy, the predetermined condition for commanding the elevated clamping pressure includes determining that the timer has reached a predetermined threshold; the vehicle condition being further selectable from a severe condition and an unreliable road condition; the compensation strategy being further selectable from a severe compensation strategy and an unreliable road compensation strategy; the severe compensation strategy being selected when the severe condition has been determined; the unreliable road compensation strategy being selected when the unreliable road condition has been determined; the method or controller/control system/CVT being configured to, or having a control logic to, command a severe clamping pressure to be applied to the variator assembly and commanding a reduction in a maximum possible engine torque if the severe compensation strategy has been selected; command an unreliable road clamping pressure to be applied to the variator assembly if the unreliable road compensation strategy has been selected; wherein determining the vehicle operation parameters includes determining wheel slip magnitude, wheel slip acceleration, transmission output acceleration, longitudinal acceleration, latitudinal acceleration, and/or engine speed; the method or controller/control system/CVT being configured to, or having a control logic to, determine whether the wheel slip exceeds an initial wheel slip threshold for at least a debounce duration; the method or controller/control system/CVT being configured to, or having a control logic to, select one of the elevated compensation strategy, the unreliable road compensation strategy, the high compensation strategy, and the severe compensation strategy if the wheel slip magnitude exceeds the initial wheel slip magnitude threshold for at least the debounce duration.

Further additional features may include the following, without limitation: the method or controller/control system/CVT being configured to, or having a control logic to, lower the initial wheel slip magnitude threshold to a lowered wheel slip magnitude threshold if the one of the following clamping pressures is commanded to be applied to the variator assembly: the unreliable road clamping pressure, the elevated clamping pressure, the high clamping pressure, and the severe clamping pressure; wherein the severe condition includes the wheel slip exceeding a severe threshold; the severe threshold being greater than the initial wheel slip threshold; wherein the unreliable road condition includes at least one of the following: a predetermined number of bumps in a bump threshold timeframe, wheel slip occurring for longer than a holding timeframe, and a predetermined number of wheel slip detections in an unreliable road timeframe; wherein the unreliable road clamping pressure is lower than the elevated clamping pressure; wherein the unreliable road clamping pressure is determined based on at least the following criteria: magnitude of wheel slip, vehicle speed, input torque, throttle input, and vehicle acceleration.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
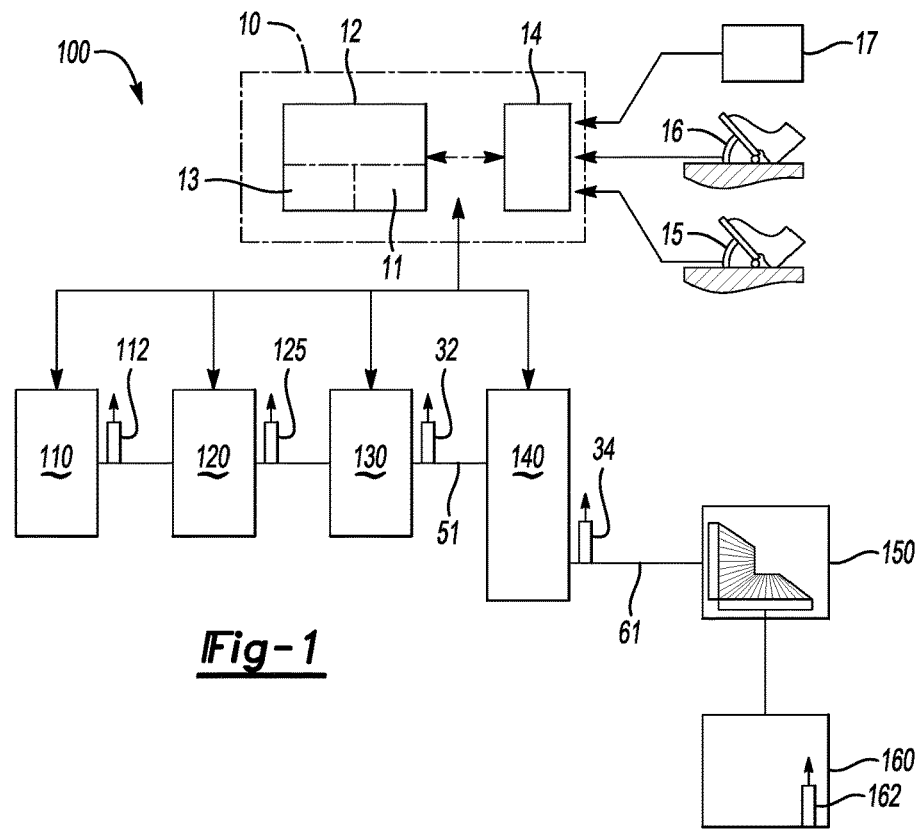
FIG. 1 is a schematic illustration of a motor vehicle propulsion system that includes an internal combustion engine rotatably coupled to a continuously variable transmission (CVT) via a torque converter and a gear box, in accordance with the principles of the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Referring now to the drawings, wherein like reference numbers correspond to like or similar components throughout the several figures, FIG. 1 schematically illustrates elements of a motor vehicle propulsion system 100 that includes an engine 110, such as an internal combustion engine, rotatably coupled to a continuously variable transmission (CVT) 140 via a torque converter 120 and a gear box 130. The motor vehicle propulsion system 100 is coupled via a driveline 150 to a set of motor vehicle wheels 160 to provide tractive effort when employed on a vehicle. Operation of the motor vehicle propulsion system 100 may be monitored and controlled by a control system 10 in response to driver commands and other vehicle operation factors. The motor vehicle propulsion system 100 may be part of a device which may be a vehicle, a robot, farm implement, sports-related equipment or any other transportation device.

The engine 110 may be any suitable engine, such as an internal combustion engine capable of transforming hydrocarbon fuel to mechanical power to generate torque in response to commands originating from the control system 10. The engine 110 may also or alternatively include an electric motor (not shown). The torque converter 120 may be a device providing fluidic coupling between its input and output members for transferring torque.

The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative examples, either or both the torque converter 120 and the gear box 130 may be omitted.

The gear box 130 includes an output member that rotatably couples to the CVT 140 via an input member 51. One example of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gear set, a chain drive gear set or another suitable gear arrangement for transferring torque to one or more vehicle wheels 160.

The motor vehicle propulsion system 100 preferably includes one or more sensors or sensing devices for monitoring rotational speeds of various devices, including, e.g., an engine speed sensor 112, a torque converter turbine speed sensor 125, a CVT variator input speed sensor 32, a CVT variator output speed sensor 34, and one or more wheel speed sensors 162 for any wheel of the set of wheels 160. Each of the aforementioned speed sensors may be any suitable position/speed sensing device, such as a Hall-effect sensor. Each of the aforementioned speed sensors communicates with the control system 10.

The control system 10 preferably includes at least one controller 12 and may include a user interface 14. A single controller 12 is shown for ease of illustration. The controller 12 may include a plurality of controller devices wherein each of the controllers 12 may be associated with monitoring and controlling a single system. This may include an engine control module (ECM) for controlling the engine 110 and a transmission controller (TCM) for controlling the CVT 140 and for monitoring and controlling a single subsystem, e.g., a torque converter clutch.

The controller 12 preferably includes at least one processor and at least one memory device 11 (or any non-transitory, tangible computer readable storage medium) on which are recorded instructions for executing instruction sets for controlling the CVT 140, and a memory cache 13. The memory device 11 can store controller-executable instruction sets, and the processor can execute the controller-executable instruction sets stored in the memory 11.

The user interface 14 communicates with and monitors operator input devices, such as, for example, an accelerator pedal 15, a brake pedal 16, and a transmission gear selector 17. The user interface 14 determines an operator torque request based upon the aforementioned operator inputs. In one example, the transmission gear selector 17 includes a tap-up/tap-down feature, whereby a vehicle operator may manually select a transmission gear ratio, thus overriding transmission control.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
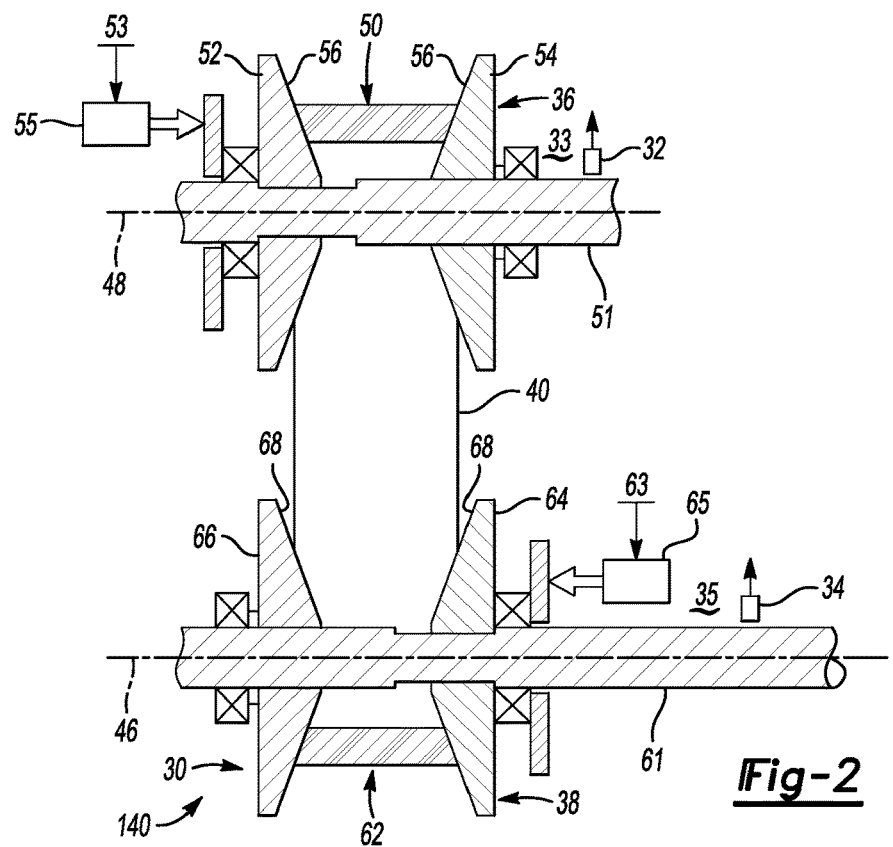
FIG. 2 schematically illustrates additional elements of the CVT shown in FIG. 1, according to the principles of the present disclosure.

FIG. 2 schematically illustrates elements of a variator assembly or variator assembly 30 of a chain-type or belt-type continuously variable transmission (CVT) 140 that may be advantageously controlled by the control system 10. The variator 30 transfers torque between the first rotating member 51, or input member, and the second rotating member 61, or output member.

The variator assembly 30 includes a first, or primary pulley 36, a second, or secondary pulley 38, and a continuous rotatable device 40, such as a belt or chain, or any flexible continuous rotating device, that rotatably couples the first and second pulleys 36, 38 to transfer torque therebetween. The first pulley 36 rotatably attaches to the input member 51, the second pulley 38 rotatably attaches to the output member 61, and the rotatable device 40 may be adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. One of the first and second pulleys 36, 38 may act as a ratioing pulley to establish a speed ratio and the other of the first and second pulleys 36, 38 may act as a clamping pulley to generate sufficient clamping force to transfer torque therebetween. As used herein, the term 'speed ratio' refers to a variator speed ratio, which may be a ratio of a CVT output speed and a CVT input speed.

The first pulley 36 may be split perpendicular to the first axis 48 to define an annular first groove 50 that may be formed between a moveable sheave 52 and a stationary sheave 54. The moveable sheave 52 axially moves or translates along the first axis 48 relative to the stationary sheave 54. For example, the moveable first sheave 52 may be attached to the input member 51 via a splined connection, thereby allowing axial movement of the moveable first sheave 52 along the first axis 48 without allowing rotational movement about the first axis 48. The stationary first sheave 54 may be disposed opposite the moveable first sheave 52. The stationary first sheave 54 may be axially fixed to the input member 51 along the first axis 48. As such, the stationary first sheave 54 does not move in the axial direction of the first axis 48.

The moveable first sheave 52 and the stationary first sheave 54 each include a first groove surface 56. The first groove surfaces 56 of the moveable first sheave 52 and the stationary first sheave 54 are disposed opposite each other to define the annular first groove 50 therebetween. The opposed first groove surfaces 56 preferably form an inverted frustoconical shape such that a movement of the moveable first sheave 52 towards the stationary first sheave 54 increases an outer pulley diameter of the annular first groove 50. An actuator 55 may be arranged with the first pulley 36 to control an axial position of the moveable first sheave 52 in response to a drive signal 53, including urging the moveable first sheave 52 towards the stationary first sheave 54.

Similar to the first pulley 36, the second pulley 38 may be split perpendicular to the second axis 46 to define an annular second groove 62 therebetween. The annular second groove 62 may be disposed perpendicular to the second axis 46. The second pulley 38 includes a moveable sheave 64 and a stationary sheave 66. The moveable sheave 64 axially moves or translates along the second axis 46 relative to the stationary sheave 66, for example, along a spline on the output member 61.

The stationary second sheave 66 may be disposed opposite the moveable second sheave 64. The stationary second sheave 66 may be axially fixed to the output member 61 along the second axis 46. As such, the stationary second sheave 66 does not move in the axial direction of the second axis 46. The moveable second sheave 64 and the stationary second sheave 66 each include a second groove surface 68. The second groove surfaces 68 of the second sheaves 64, 66 are disposed opposite each other to define the annular second groove 62 therebetween.

The opposed second groove surfaces 68 preferably form an inverted frustoconical shape such that a movement of the moveable second sheave 64 towards the stationary second sheave 66 increases an outer pulley diameter of the annular second groove 62. An actuator 65 may be arranged with the second pulley 38 to control an axial position of the moveable second sheave 64 in response to a driven signal 63, including urging the moveable second sheave 64 towards the stationary second sheave 66.

In one example, the actuators 55, 65 may be hydraulically-controlled devices, and the driven signals 53, 63 may be hydraulic pressure signals. A ratio of the outer pulley diameter of the first pulley 36 and the outer pulley diameter of the second pulley 38 defines a transmission torque ratio.

Other elements, such as clutch assemblies in the form of selectable one-way clutches and the like may be deployed between the variator 30 and other powertrain and driveline components and systems.

The control system 10 of FIG. 1 may be programmed to execute the steps of a method 200, 300, 400 as defined in FIGS. 3-6 and as discussed in greater detail below.

Figure 3:
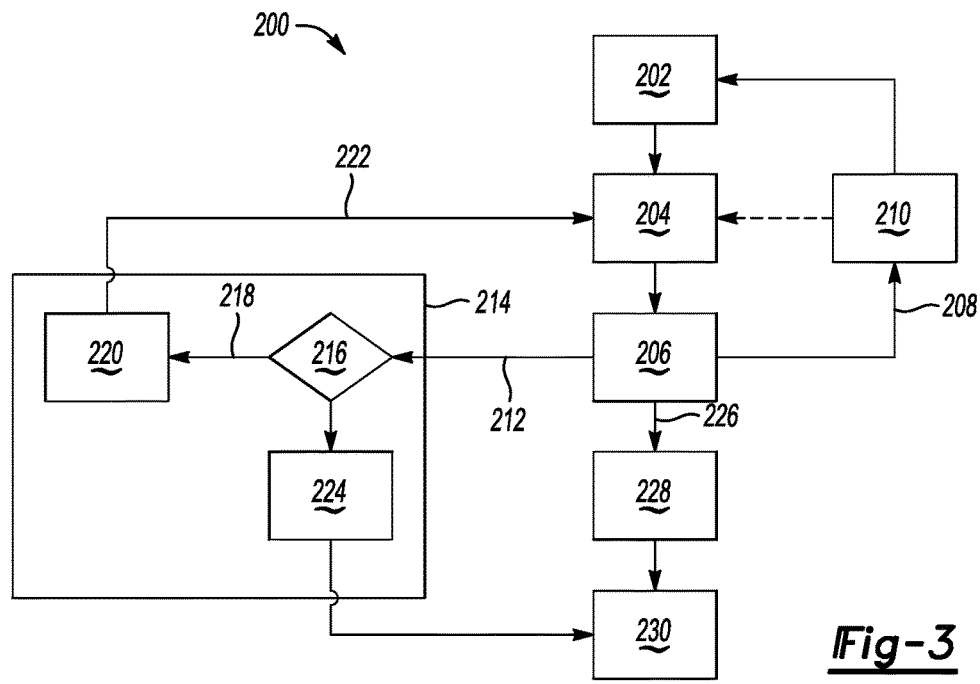
FIG. 3 schematically shows a block diagram of an example CVT control system and method that can be employed to adjust the variator torque capacity and/or clamping pressure of the CVT of FIGS. 1-2 to control the CVT, in accordance with the principles of the present disclosure.

Referring now to FIG. 3, a flowchart of on variation of a method 200 stored on an instruction set and executable by the controller 12 of the control system 10 is shown. For example, the method 200 is a method for controlling a continuously variable transmission (CVT) including a variator assembly for a motor vehicle.

The method 200 may begin with step or block 202, where the method 200 includes commanding an initial minimum clamping pressure to be applied the variator assembly 30 of the CVT 140. For example, the step 202 may command that a clamping pressure for normal operating conditions be applied to the CVT 140 of the vehicle system 100.

In step or block 204, the control system 10 may be programmed or configured to monitor and detect the operating state of the vehicle and/or to determine at least one vehicle operation parameter, through the use of sensors, by way of example. The vehicle operation parameters determined may include, but are not limited to, vehicle speed, engine speed, torque converter turbine speed, CVT variator input speed, CVT variator output speed, brake pedal actuation, accelerator pedal actuation, TCM gear state, vehicle acceleration, engine acceleration, wheel slip magnitude, wheel slip acceleration, transmission output acceleration, longitudinal acceleration, and latitudinal acceleration.

At step or block 206, the control system 10 is configured to determine a vehicle condition based on the one or more vehicle operation parameters determined in block 204. For example, the vehicle condition may be selected from a base condition (which could be equivalent to normal operating conditions), an elevated condition, and a high condition. Each of the elevated and high conditions are conditions wherein a torque disturbance is predicted to occur, or is occurring, with the CVT output. Such a condition indicates that additional torque carrying capacity is needed, or will soon be needed, by the CVT 140.

Elevated or high conditions include situations where a vehicle event exists or a vehicle maneuver may be executed that could potentially disrupt or damage the CVT 140. In one example, the control system 10 monitors a loss of vehicle traction such as a wheel slip event or the like, which could occur if one of the driving wheels is not in contact with the road surface, such as when hitting a pothole, or if the one of the driving wheels is in contact with a low-friction surface, such as ice.

Wheel slip is often a first indication that the CVT will soon require additional torque carrying capacity. The magnitude and duration of wheel slip or other torque disturbances, however, can greatly vary in capacity. For example, a wheel slip observed at the beginning of a pothole impact and transition to a rough road may be very similar. However, the duration of wheel slip that a pothole produces could be less than 100 ms, for example, and a rough road could generate wheel slip for several seconds. The magnitude of the wheel slip also may vary based on severity of road conditions, as well as vehicle operating state (such as throttle, speed, and torque ratio). Wheel slip may be used to refer to a condition wherein a determined wheel slip magnitude exceeds a predetermined threshold, or wherein a determined wheel slip acceleration exceeds a predetermined threshold.

The block 206 can be configured to determine any number of vehicle conditions. In the illustrated example, the block 206 determines whether the vehicle is in a base condition, an elevated condition, or a high condition. When the vehicle is in the base condition, the process or method 200, which may be executed by the control system 10, follows path 208 to a block 210. In block 210, a base compensation strategy is selected. The base compensation strategy is selected when the block 206 determines that the vehicle is in the base condition. The base condition may represent normal operating conditions, where no additional torque carry capacity is needed beyond the initial torque applied in block 202. Accordingly, the method 200 returns to the block 202 to command the initial minimum clamping pressure, or to continue the command already executed in step 202. In the alternative, the method 200 could proceed from block 210 to block 204 (as shown with a dashed line) to again determine the vehicle operation parameters. This is because it may not be necessary to command that the initial clamping pressure be applied, if it has already been applied and no changes to the clamping pressure have been made.

If, in block 206, however, a vehicle condition other than the base condition is determined, the method 200 proceeds along a different path to select a compensation strategy other than the base compensation strategy.

For example, when the elevated condition has been determined in block 206, this means that the control system 10 has determined that additional torque carrying capacity is needed or may be needed in the near future by the vehicle system 100. If the elevated condition has been determined, the process or method 200, which may be executed by the control system 10, follows path 212 to a block 214. In block 214, the method 200 selects an elevated compensation strategy. In other words, the elevated compensation strategy is selected when the block 206 determines that the vehicle is in the elevated condition.

Within the elevated compensation strategy, the block 214 includes a step 216 of determining whether a predetermined condition has been met. One such predetermined condition could be whether a certain event, such as wheel slip, has occurred for a sufficient duration. If the predetermined condition has not been satisfied, the method 200 proceeds along path 218 to block 220. Block 220, which is optional, includes activating or incrementing a timer to calculate duration of wheel slip. Thus, the predetermined condition may include determining that the timer has reached a predetermined threshold. From block 220, or directly from block 216 if block 220 is not included, the method 200 proceeds along path 222 back to step 204, where the vehicle condition is again determined.

If in block 216, it is determined that the predetermined condition has been met, the method 200 proceeds to block 224, which includes commanding an elevated clamping pressure to be applied to the variator assembly. After the elevated clamping pressure is commanded, the method 200 may proceed to step 230 to take further action, which may eventually conclude with starting the method 200 over and/or eventually applying the initial minimum clamping pressure. For example, if the elevated vehicle condition is no longer detected, then the initial minimum clamping pressure should be reapplied.

When the high condition has been determined in block 206, this means that the control system 10 has determined that additional torque carrying capacity is needed or may be needed in the near future by the vehicle system 100. This could be under harsh or severe conditions, for example. If the high condition has been determined, the process or method 200, which may be executed by the control system 10, follows path 226 to a block 228. In block 228, the method 200 selects a high compensation strategy. In other words, the high compensation strategy is selected when the block 206 determines that the vehicle is in the high condition. The high compensation strategy includes commanding a high clamping pressure to be applied to the variator assembly. In some examples, the high clamping pressure may be greater than the elevated clamping pressure. Both the elevated clamping pressure and the high clamping pressure are greater than the initial minimum clamping pressure.

After the high clamping pressure is commanded, the method 200 may proceed to step 230 to take further action, which may eventually conclude with starting the method 200 over and/or eventually applying the initial minimum clamping pressure. For example, if the high vehicle condition is no longer detected, then the initial minimum clamping pressure should be reapplied.

Each of the elevated and high compensation strategies are used by the control system 10 to identify the type of critical event or maneuver and apply at least one control element to the variator assembly of the CVT 140 to avoid damage or abuse to the CVT 140.

The control system detection strategy of the control system 10 may be configured to identify any number of various disturbances, such as a generalized road disturbance, a sudden deceleration of the vehicle, and/or a rolling change of direction of the vehicle, by way of example. The control system 10 may be further configured to detect a wheel slip event, or loss of wheel traction. A loss of wheel traction may include one or more of the following non-limiting events, such as a loss of wheel traction based on the wheel interaction with an ice, snow, gravel, or split friction surface. Such disturbances are shown as generally being detected in step 204 and classified in step 206 to determine a resultant compensation strategy to apply in steps 210, 214, and 228.

Upon identification that the elevated or high compensation strategies should be implemented, for example, upon a wheel slip magnitude or acceleration exceeding a predetermined threshold, the control system 10 will implement the elevated or high compensation strategy to protect the variator assembly 30 of the CVT 140, in this example. The control system 10 may adjust the clamping pressure being supplied to the pulleys 36, 38 to overclamp (or clamp at a greater pressure) the chain or belt 40 in order to protect the CVT 140. The adjustment of the variator torque capacity and/or the clamping pressure in the CVT 140 may have a similar effect to a downshift in a step gear transmission to protect the CVT 140 from damage. The adjusted variator torque capacity or clamping pressure from blocks 224 or 228 are transmitted to the CVT 140 to apply the desired adjustment to the clamping pressure and/or change in the variator torque capacity to the CVT 140.

Figure 4:
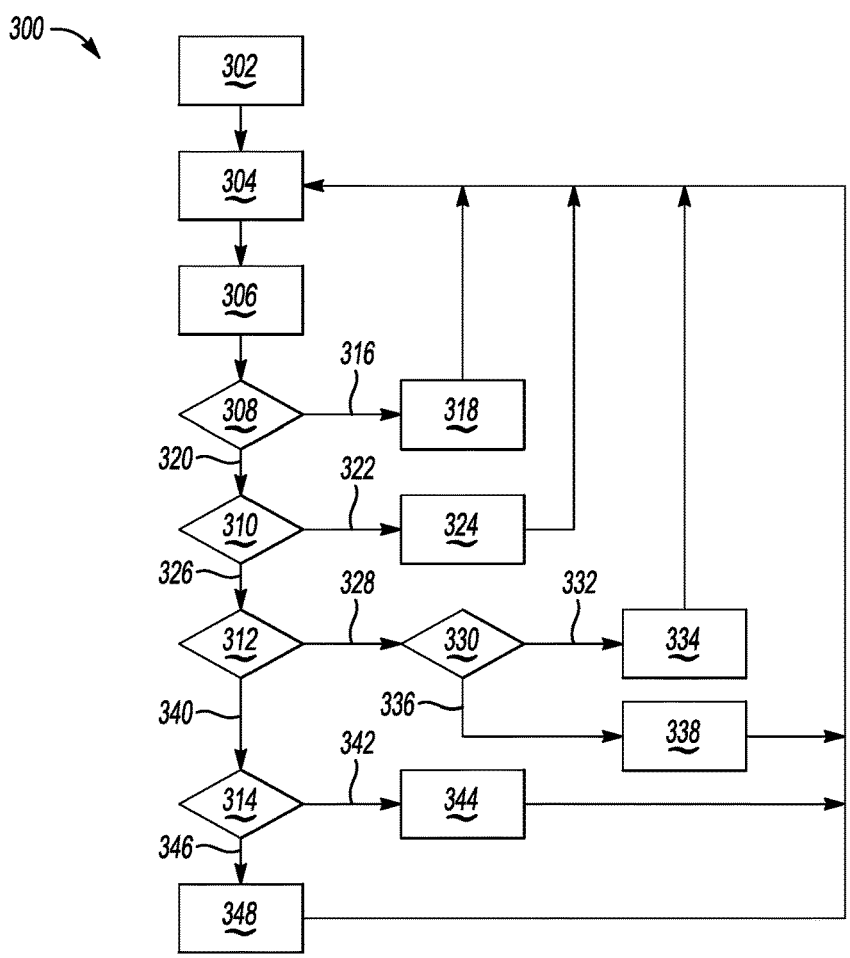
FIG. 4 schematically shows a block diagram of another example CVT control system and method that can be employed to adjust the variator torque capacity and/or clamping pressure of the CVT of FIGS. 1-2 to control the CVT, according to the principles of the present disclosure.

Referring now to FIG. 4, another variation of a method for controlling a continuously variable transmission (CVT) 140 including a variator assembly 30 is illustrated and generally designated at 300. The main difference between the method 300 illustrated in FIG. 4 and the method 200 illustrated in FIG. 3 is that the method 300 includes four vehicle conditions and compensation strategies that are elevated or high, rather than just two elevated/high compensation strategies as shown in FIG. 3. Similarly to the method 200 described above, the method 300 may include an initial step 302 of commanding an initial minimum clamping pressure to be applied the variator assembly 30 of the CVT 140. For example, the step 302 may command that a clamping pressure for normal operating conditions be applied to the CVT 140 of the vehicle system 100.

In step or block 304, the control system 10 may be programmed or configured to monitor and detect the operating state of the vehicle and/or to determine at least one vehicle operation parameter, via one or more sensors or sensing devices. The vehicle operation parameters may include, but are not limited to, vehicle speed, engine speed, torque converter turbine speed, CVT variator input speed, CVT variator output speed, brake pedal actuation, accelerator pedal actuation, TCM gear state, vehicle acceleration, engine acceleration, wheel slip magnitude, wheel slip acceleration, transmission output acceleration, longitudinal acceleration, and latitudinal acceleration.

At step or block 306, the control system 10 is configured to determine a vehicle condition based on the one or more vehicle operation parameters determined in block 304. The vehicle condition may be selected from any number of vehicle conditions, such as a base condition (which could be normal operating conditions), an unreliable road condition, a potential damage condition, a harsh condition, and a severe condition. Except for the base condition, any of the other conditions can be implemented as the elevated or high condition described above in method 200 and with respect to FIG. 3. Each of the unreliable road, potential damage, harsh, and severe conditions are conditions wherein a torque disturbance is predicted to occur, or is occurring, with the CVT output. Such a condition indicates that additional torque carrying capacity is needed, or will soon be needed, by the CVT 140. In one example, the control system 10 monitors a loss of vehicle traction such as a wheel slip event or the like, which could occur if one of the driving wheels is not in contact with the road surface, such as when hitting a pothole, or if the one of the driving wheels is in contact with a low-friction surface, such as ice.

Each of the blocks 308, 310, 312, 314 determines which vehicle condition has been selected by block 306. For example, in block 308, the system 10 and/or method 300 includes determining whether the severe condition has been selected. In other words, the block 308 determines whether conditions have been satisfied such that the control system 10 and/or method 300 should follow a severe conditions compensation strategy. The severe conditions include situations where the torque disturbance is so high that maximum clamping of the CVT is not enough to ensure protection of the CVT and to prevent slippage of the continuous member 40. In such severe cases, a reduction in engine torque is also required. Accordingly, if the block 308 determines that the severe condition has been satisfied or determined, then the method 300 proceeds along path 316 to a block 318, which includes selecting and implementing a severe compensation strategy. Under the severe compensation strategy, and the engine torque is reduced and the CVT clamping pressure is increased. In some cases, the CVT clamping pressure is increased to a maximum level. The method 300 then proceeds back to step 304 to determine the vehicle parameters again, and the condition will be determined in step 306 based on the parameters. When the severe condition is no longer present, the method 300 and system 10 will choose a different path.

Thus, if in step 308, it is determined that the severe condition has not been satisfied or determined, the method 300 proceeds along path 320 to determine whether the harsh condition has been determined or satisfied in step 306. In other words, the block 310 determines whether the conditions have been satisfied such that the control system 10 and/or method 300 should follow a harsh conditions compensation strategy. The harsh conditions include situations where the torque disturbance is present, but the conditions are not so severe that a reduction in engine torque is needed. In such harsh cases, if the block 310 determines that the harsh condition has been satisfied or determined or block 306, then the method 300 proceeds along path 322 to a step 324, which includes selecting and implementing a harsh compensation strategy. Under the harsh compensation strategy, the CVT 140 is clamped at an elevated pressure, which is greater than the initial minimum clamping pressure. The clamping pressure according to the harsh compensation strategy may be the maximum clamping pressure, or it may be less than the maximum clamping pressure. The method 300 then proceeds back to step 304 to determine the vehicle parameters again, and the condition will be determined in step 306 based on the parameters. When the harsh condition is no longer present, the method 300 and system 10 will choose a different path.

Thus, if in step 308, it is determined that the severe condition has not been satisfied or determined, and if in step 310, it is determined that the harsh condition has not been satisfied or determined, the method 300 proceeds along path 326 to determine whether the potential damage condition has been determined or satisfied in step 306. In other words, the block 312 determines whether the conditions have been satisfied such that the control system 10 and/or method 300 should follow a potential damage conditions compensation strategy. The potential damage conditions include situations where the torque disturbance is present, but the conditions are not so severe that a reduction in engine torque is needed. In addition, another predetermined condition is required in order to adjust the clamping pressure. This condition may include ensuring that a sufficient amount of time has elapsed since the torque disturbance was detected. Accordingly, if the block 312 determines that the potential damage condition has been satisfied or determined, then the method 300 proceeds along path 328 to a step or block 330. In block 330, the method 300 and/or control system 10 determines whether the additional predetermined condition has been met. In this case, the predetermined condition is whether the potential damage condition has persisted for a sufficient (predetermined) amount of time.

If the block 330 determines that the potential damage condition has persisted for a sufficient, predetermined amount of time, the method 300 proceeds along path 332 to a block 334, where the control system 10 takes precautions for potential damage conditions, which includes selecting and implementing a potential damage compensation strategy and increasing the clamping pressure. Under the potential damage compensation strategy, the CVT 140 is clamped at a pressure great enough to prevent damage if the predetermined condition has been met (sufficient time has elapsed, in this example). The clamping pressure under the potential damage compensation strategy is greater than the initial minimum clamping pressure. The method 300 then proceeds back to step 304 to determine the vehicle parameters again, and the condition will be determined in step 306 based on the parameters.

If, however, the block 330 determines that the potential damage condition has not persisted for a sufficient amount of time (the predetermined condition has not been met), the method 300 proceeds from block 330 along path 336 to a timer block 338. The timer block 338 activates or increments a timer to keep track of how long the potential damage condition is present. The method 300 then proceeds back to step 304 to determine the vehicle parameters again, and the condition will be determined in step 306 based on the parameters. If the potential damage condition is still present, the block 312 will again determine this, and then step 330 will inquire whether sufficient time has elapsed. If sufficient time has not elapsed, the timer block 338 will be incremented further. The method 300 then proceeds back to step 304. As long as the potential damage condition persists, the block 312 will direct the inquiry along path 328 to determine whether sufficient time passed in block 330.

When the potential damage condition is no longer present, the method 300 and system 10 will choose a different path. Thus, if in step 308, it is determined that the severe condition has not been satisfied or determined, and if in step 310, it is determined that the harsh condition has not been satisfied or determined, and if in step in 312, it is determined that the potential damage condition has not been determined or satisfied, the method 300 proceeds along path 340 to determine whether the unreliable road condition has been determined or satisfied in step 314. In other words, the block 314 determines whether the conditions have been satisfied such that the control system 10 and/or method 300 should follow an unreliable road conditions compensation strategy.

The unreliable road condition may include situations where variable torque disturbances continue to occur over a period of time. The unreliable road condition could be caused by a rough dirt road, or an icy road. Such conditions may also be referred to as rough road or variable mu conditions, because the surface friction varies. The unreliable road condition may be selected if a predetermined number of bumps occur in a threshold timeframe, and/or if wheel slip is occurring for longer than a short wheel slip threshold timeframe, and/or if in a certain timeframe, a certain number of detected wheel slip events occur. In such situations, it may be desirable to hold the clamping pressure to above the initial minimum clamping pressure, but at a pressure that is not as high as a maximum or even as high as clamping pressure due to other wheel slip events under the other compensation strategies. This puts the pressure at a higher amount, which is easier to increase if one of the severe, harsh, or potential damage conditions is detected later.

Accordingly, if the block 314 determines that the unreliable road condition has been satisfied or determined, then the method 300 proceeds along path 342 to a step or block 344, which includes selecting and implementing an unreliable road compensation strategy. Under the unreliable road compensation strategy, the clamping pressure is increased to anticipate greater torque disturbances, as explained above, so that the clamping pressure is greater than the initial minimum clamping pressure, but which may be lower than the clamping pressure used for the potential damage compensation strategy, the harsh compensation strategy, and the severe compensation strategy. The level of clamping pressure to be used under unreliable road conditions may be determined based on a look up table, by way of example. This table look up can be based on the wheel slip magnitude, wheel slip acceleration, engine speed, input torque, throttle input, acceleration, transmission pulley speeds or a variety of other inputs. This reduces over-clamping, thus improving durability. In addition, for wheel slip events where wheel slip increases at a slow rate, the control system 10 can ramp up the minimum clamp force to a table calculated value instead of setting minimum clamp force to a maximum clamping pressure/force immediately when the wheel slip magnitude threshold is passed. For example, when the control system 10 detects that a wheel slip event is not merely transient and an unreliable road condition applies, the control system 10 can set the clamping pressure based on the table look up.

The method 300 then proceeds back to step 304 to determine the vehicle parameters again, and the condition will be determined in step 306 based on the parameters. When the unreliable road condition is no longer present, the method 300 and system 10 will choose a different path.

Thus, if in step 308, it is determined that the severe condition has not been satisfied or determined, and if in step 310, it is determined that the harsh condition has not been satisfied or determined, and if in step 312, it is determined that the potential damage condition has not been satisfied or determined, and if in step 314, it is determined that the unreliable road condition has not been satisfied or determined, the method 300 proceeds along path 346 to block 348. In block 348, the base compensation strategy is selected and applied. The base compensation includes commanding the initial minimum clamping pressure to be applied to the variator assembly 30, or if the initial minimum clamping pressure is already being applied, then no change is required.

The method 300 then proceeds back to step 304 to determine the vehicle parameters again, and the condition will be determined in step 306 based on the parameters. When the base condition is no longer present, the method 300 and system 10 will choose a different path.

Figure 5:
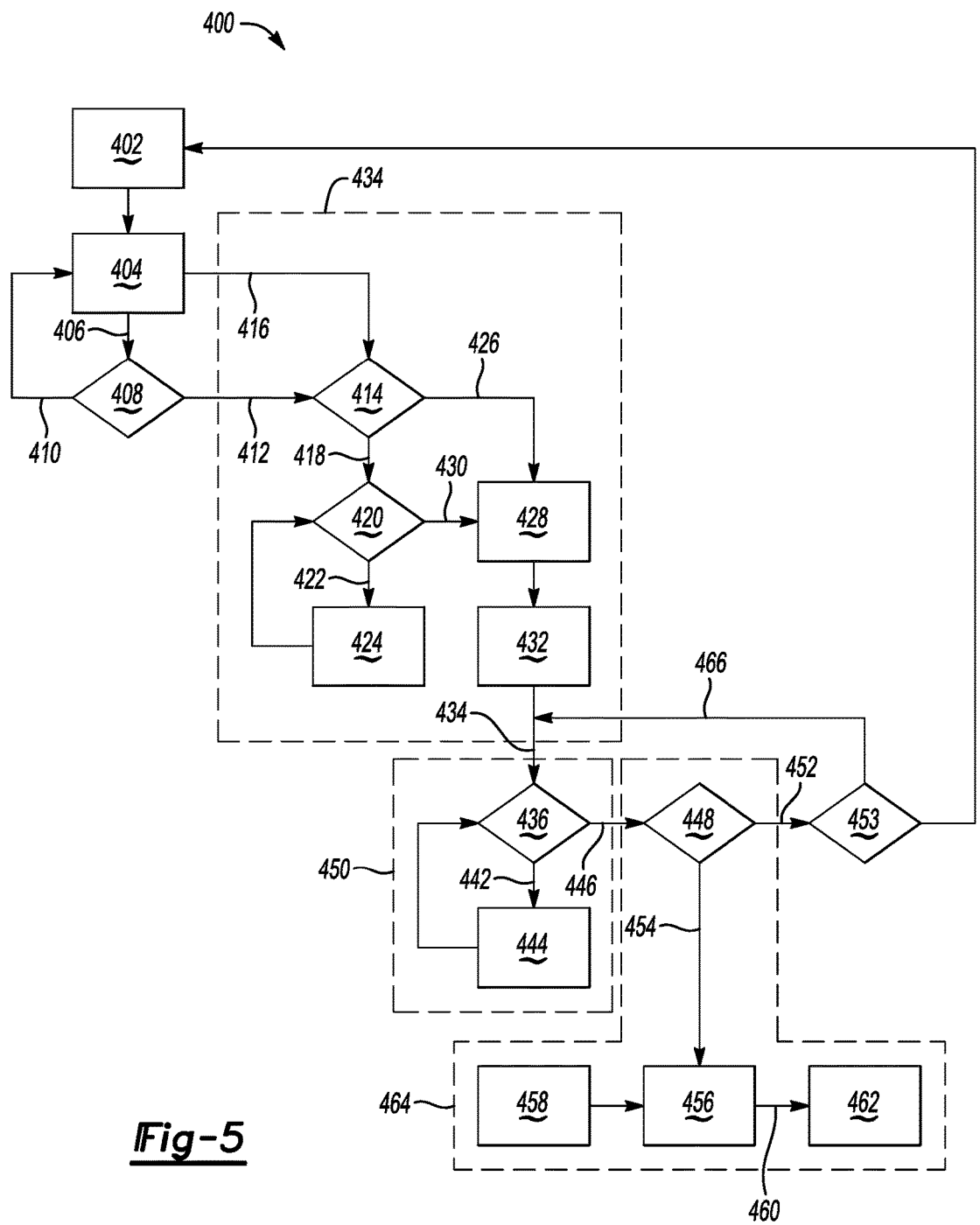
FIG. 5 schematically shows a block diagram of yet another example CVT control system and method that can be employed to adjust the variator torque capacity and/or clamping pressure of the CVT of FIGS. 1-2 to control the CVT, in accordance with the principles of the present disclosure.

Referring now to FIG. 5, one variation of the methods 200, 300 described above is tailored to a wheel slip event, and is generally designated as method 400. The method 400 is another variation of a method for controlling a continuously variable transmission (CVT) 140 including a variator assembly 30. The method 400 may include an initial step 402 of commanding an initial minimum clamping pressure to be applied the variator assembly 30 of the CVT 140. For example, the step 402 may command that a clamping pressure for normal operating conditions be applied to the CVT 140.

In step or block 404, the control system 10 may be programmed or configured to monitor and detect one or more vehicle operation parameters, such as wheel slip magnitude (also referred to as wheel slip) and wheel slip acceleration, via one or more sensors. In this example, wheel slip magnitude and wheel slip acceleration are two of the parameters monitored and detected. Other vehicle operation parameters determined may include, but are not limited to, vehicle speed, engine speed, torque converter turbine speed, CVT variator input speed, CVT variator output speed, brake pedal actuation, accelerator pedal actuation, TCM gear state, vehicle acceleration, engine acceleration, transmission output acceleration, longitudinal acceleration, and latitudinal acceleration.

From block 404, the method 400 proceeds along a path 406 to block 408. In block 408, the method 400 and/or control system 10 determines whether the wheel slip magnitude exceeds a predetermined threshold. If the wheel slip magnitude does not exceed the predetermined threshold, the method 400 proceeds along path 410 back to block 404 to continue determining the operation parameter(s), including wheel slip magnitude. In this example, the method 400 loops between blocks 404 and 408 until the wheel slip magnitude exceeds the predetermined threshold.

If the block 408 determines that the wheel slip magnitude does exceed the predetermined threshold, the method 400 proceeds along path 412 to block 414. Simultaneously, the method 400 proceeds from block 404 along path 416 to block 414. In block 414, the control system 10 determines whether the wheel slip acceleration exceeds a predetermined threshold. If the wheel slip acceleration threshold does not exceed the predetermined threshold, the method 400 proceeds along path 418 to a block 420. In block 420, a determination of another predetermined condition is required in order to adjust the clamping pressure. This condition may include ensuring that a sufficient amount of time has elapsed since the wheel slip magnitude threshold was exceeded.

Accordingly, if the block 420 determines that the wheels have not been slipping above the wheel slip magnitude threshold for longer than a predetermined timeframe, the method 400 proceeds along path 422 to a timer block 424. The timer block 424 activates or increments a timer to keep track of how long the wheels are slipping above the wheel slip magnitude. The method 400 then proceeds back to step 420 to determine whether the wheel slip has exceeded the wheel slip magnitude for the sufficient predetermined amount of time. Step 420 obtains the wheel slip data from the control system 10. If sufficient time has not elapsed, the timer block 424 will be incremented further. The method 400 then proceeds back to step 420. As long as the wheel slip magnitude is being exceeded, the block 420 will determine whether the sufficient time has passed and increment the timer in block 424 if the sufficient time has not passed.

If the block 414 determines that wheel slip acceleration exceeds a predetermined threshold, the method 400 will proceed along path 426 to a block 428. In addition, if the block 420 determines that the wheels have been slipping above the wheel slip magnitude for the predetermined timeframe, the method 400 will proceed along path 430 to block 428. Either a positive condition in block 414 (wheel slip acceleration above a predetermined threshold) or block 420 (wheel slip magnitude above a predetermined threshold for a predetermine timeframe) causes the method 400 to arrive at block 428.

In block 428, a predetermined clamping pressure is set at an adjusted level that is higher than the initial minimum clamping pressure and commanded to be applied to the variator assembly 30. In some examples, the block 428 may set the clamping pressure to a maximum clamping pressure. After a predetermined timeframe has passed, the method 400 then proceeds to block 432, wherein the method 400 lowers the clamping pressure to an elevated threshold that is higher than the initial minimum clamping pressure, but lower than the clamping pressure commanded in block 428.

Each of the blocks 414, 420, 424, 428, and 430 are enclosed in a module 434, which is the momentary wheel slip module 434. The momentary wheel slip module 434 compensates for momentary wheel slip events.

After the threshold calibration is lowered in step 432, the method 400 then proceeds along path 434 to block 436. In block 436, the method 400 determines whether the wheel slip magnitude exceeds a maximum wheel slip magnitude threshold. If the wheel slip magnitude does exceed the maximum wheel slip magnitude threshold, the method 400 proceeds along path 442 to block 444. In block 444, a command to reduce the engine torque is executed. The method 400 then proceeds back to step 436 to again determine whether the wheel slip magnitude exceeds the maximum wheel slip magnitude threshold. When the wheel slip magnitude no longer exceeds the maximum wheel slip magnitude threshold, the method 400 and system 10 will proceed along path 446 to a block 448.

Each of the blocks 436 and 444 are enclosed in a module 450, which is the high magnitude wheel slip module 450. The high magnitude wheel slip module 450 compensates for high magnitude wheel slips, which require both increased clamping pressure and a reduction in engine torque.

In block 448, the method 400 determines whether wheel slip has occurred for a predetermined unreliable road timeframe. This is typically a longer timeframe than the timeframe threshold used in box 408 and module 434 to detect momentary wheel slip. The unreliable road condition may include situations where variable torque disturbances continue to occur over a period of time. The unreliable road condition, as referred to as rough road or variable mu conditions because the road friction varies, could be caused by a rough dirt road, or an icy road, by way of example. The wheel slip determined in block 448 may include measuring variable, but recurring, wheel slip. For example, block 448 could count the number of bumps occurring in the unreliable road timeframe, the continuous wheel slip for a certain timeframe, and/or a predetermined number of wheel slip events (exceeding a magnitude threshold) in the unreliable road timeframe.

If the block 448 determines that wheel slip or wheel slip events have not occurred for at least the unreliable road timeframe, the method 400 proceeds along path 452 to block 453, which is explained below.

If, however, the block 448 determines that wheel slip or wheel slip events have occurred for the unreliable road timeframe, the method 400 proceeds along path 454 to block 456. When unreliable road conditions exist, as determined by block 448, it may be desirable to hold the clamping pressure to above the initial minimum clamping pressure, but at a pressure that is not as high as a maximum or even as high as the adjusted clamping pressure used for other wheel slip events. This puts the pressure at a higher amount, which is easier to increase if one of the other wheel slip magnitude or acceleration conditions is detected. When the control system 10 detects that a wheel slip event is not merely transient and an unreliable road condition applies, the control system 10 can set the clamping pressure based on a table look up.

In block 456, the method 400 uses a table look up to determine an unreliable road clamping pressure that should be applied. The table look up may use any desirable input parameters, such as wheel slip magnitude, wheel slip acceleration, transmission pulley speeds, engine speed, input torque, throttle input, acceleration, or a variety of other inputs. The input parameters are shown in block 458 being input to block 456.

The method 400 proceeds from block 456 along path 460 to a step or block 462, which includes implementing an unreliable road clamping pressure, which is a clamping pressure that is increased to anticipate greater torque disturbances, as explained above, so that the clamping pressure is greater than the initial minimum clamping pressure, but which may be lower than the clamping pressure used in blocks 428 and even 432. This reduces over-clamping, thus improving durability. Though not shown, the method 400 may then proceed from block 462 back to block 404 to determine the vehicle parameters again.

Each of the blocks 448, 456, 458, and 462 are enclosed in a module 464, which is the unreliable road (or long term medium wheel slip) module 464. The unreliable road module 464 compensates for long term medium level wheel slips, unreliable road conditions, and/or variable mu conditions, which cause an increased, but not maximum, clamping pressure to be commanded.

In block 453, which is arrived at via path 452 (explained above), a determination is made regarding whether a wheel slip magnitude exceeds a threshold. If yes, the method 400 proceeds along path 466 back to block 436, where a determination is made as to whether the wheel slip exceeds a higher maximum wheel slip threshold. If the block 453 determines that the wheel slip magnitude does not exceed the threshold, the method 400 reverts back to block 402 along path 468, where the initial minimum clamping pressure is applied under conditions where no elevated clamping pressure is needed to protect the continuous member 40 of the CVT 140 from slipping.

Figure 6:
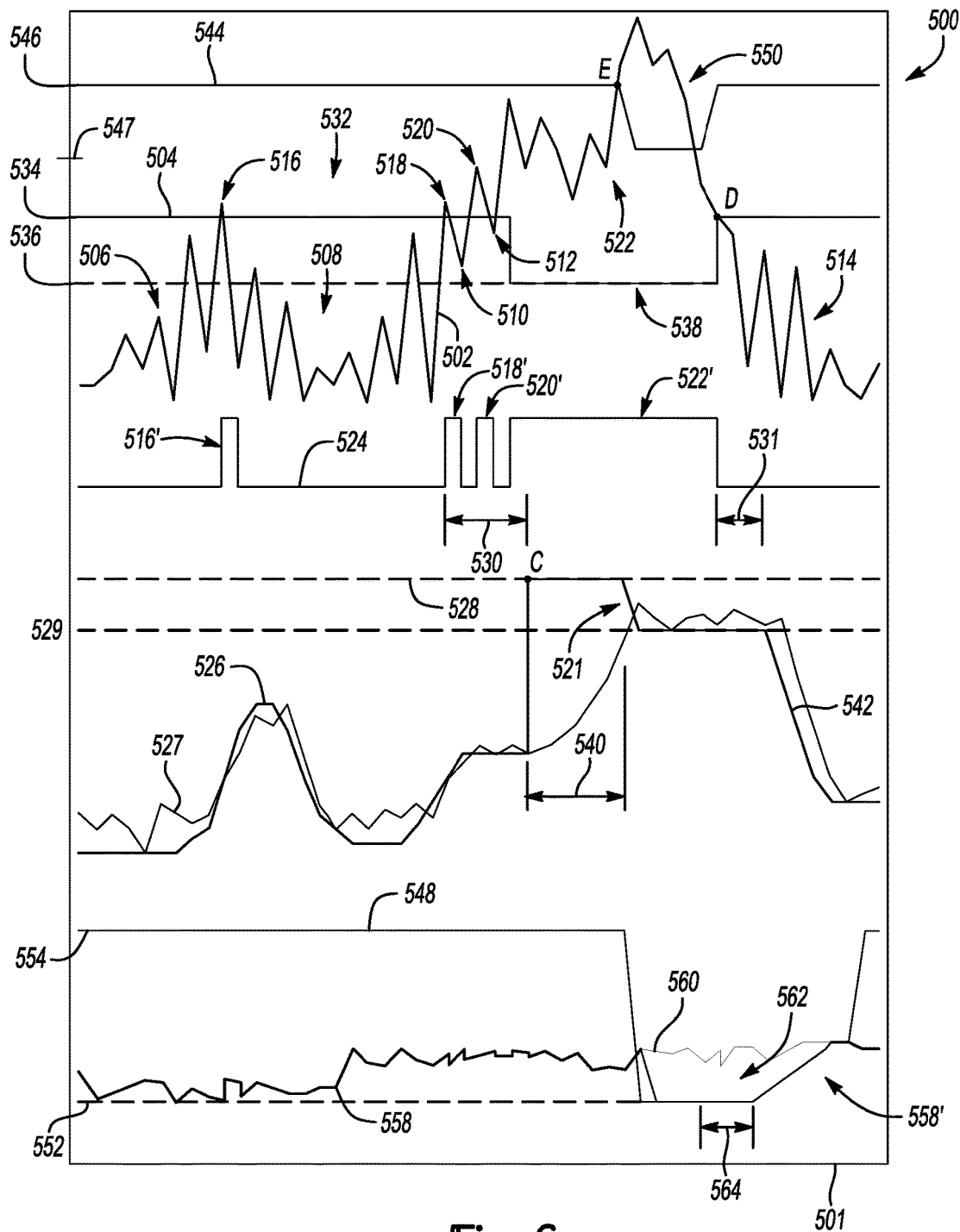
FIG. 6 is a graph illustrating various parameters of any of the CVT control systems used herein, as a function of time, according to the principles of the present disclosure.

Referring now to FIG. 6, a schematic graphical representation of the control system 10 and implementation of one or more of the methods 300, 400 is shown generally at 500. As wheel slip is often the first indication that the CVT 140 will soon require additional torque carrying capacity due to a disturbance or spike in output torque, wheel slip magnitude is used in this example as the operation parameter to make control decisions for the control system 10 of the CVT 140. In the alternative or in addition, vehicle acceleration, wheel slip acceleration, or transmission output acceleration, by way of example, could be used as the indicator of a torque disturbance. The graph 500 shows various thresholds and plots, with different magnitudes and reference axes on the vertical axis, but each is generally shown along the same relative time scale along the horizontal axis 501. Wheel slip magnitude is illustrated with relative levels at graph plot line 502.

High torque transient events are often caused by a drastic and sudden change in friction at the wheels, which causes sudden or large differential wheel speeds between driven and non-driven wheels. The duration of a wheel slip event that a pothole produces is typically less than 100 ms from the time the threshold is passed and the controller processes the signal. For both short and long wheel slip conditions, the initial reaction is the same. As soon as a threshold is crossed, the system needs to react as quickly as possible because there is little time both determine the nature of the wheel slip and react. The wheel slip threshold is indicated at graph line 504. In some examples, the wheel slip threshold 504 could be between 10-60 rpm, by way of example. Thus, in sections 506, 508, 510, 512, and 514, the wheel slip magnitude profile 502 stays under the threshold line 504, such as under 10-60 rpm, while in sections 516, 518, 520, and 522, the wheel slip magnitude 502 exceeds the threshold line 504.

The wheel slip signal line 524 is high, or true, when the wheel slip magnitude 502 is above the threshold 504. Thus, the signal line 524 is shown as high in sections 516', 518', 520', and 522', which correspond to wheel slip magnitude sections 516, 518, 520, and 522, respectively.

Minimum clamp force, which corresponds to minimum clamping pressure, is typically calculated based on input torque into the CVT 140. The commanded clamp force is indicated at graph line 526. The real force experienced is shown at graph line 527, which is calculated based on a measured pressure. However, the input torque is not an indication of the torque disturbances produced by road conditions and reflected to the output pulley 38. Due to the delay in the hydraulic system, it is desirable that when wheel slip is observed, the minimum clamp force is increased to a level such that the pulleys 36, 38 are clamped to the minimum clamp force required to prevent continuous member 40 slippage during the torque disturbance. Thus, the commanded minimum clamp force (or clamping pressure) is increased to a level 528 at point C along the clamp force profile 526. The new higher clamp force at point C should be high enough to start a fast response in the hydraulic system, but not so high as to limit ratio controllability.

To increase durability and fuel economy, a debounce duration time frame 530 may be used to avoid unnecessary over clamp after very short periods of wheel slip or when noise or error in the signal would make wheel slip artificially high. Thus, the control system 10 and method 200, 300, 400 can include determining whether the wheel slip magnitude 502 exceeds the wheel slip magnitude threshold 504 for at least the debounce duration time frame 530. The debounce duration time frame 530 can be configured to be as small as possible to avoid missing transients. If the wheel slip magnitude 502 does exceed the wheel slip threshold 504 for at least the debounce duration, one of the compensation strategies is selected, such as described above. In this case, the compensation strategy includes increasing the clamp force 526 (by increasing the corresponding clamping pressure) to level 528.

The increased clamp force level 528, implemented to the clamping force 526 at point C, may be determined as a function of engine input torque, the magnitude of wheel slip, and the speed ratio, by way of example. The increased clamp force level 528 may be chosen as a relatively high clamp force, because certain events are so fast that the control system 10 does not have enough time to determine the magnitude of the event before it can respond.

In the illustrated graph 500, the clamp force 526 is increased at point C to the level 528 because the wheel slip magnitude 502 has exceeded the wheel slip magnitude threshold 504 for more than the debounce timeframe 530 at point C. After the vehicle system 100 enters a wheel slip condition sufficient to raise the clamp force 526 to level 528, the wheel slip threshold 504 is lowered. Thus, in section 532, the wheel slip threshold 504 remains at a first level 534, but when the clamp force 526 is elevated to level 528 at point C, the wheel slip threshold 504 is dropped to a lower level 536 in a second section 538. This creates hysteresis so that the compensation strategy is less prone to activate and deactivate during certain wheel slip conditions, thus preventing a quickly changing clamping pressure command.

The magnitude of the torque disturbance varies with the severity of the road conditions and vehicle operating state (throttle, speed, ratio, etc.), but typically the pothole impact will result in a larger torque disturbance than a rough road. Long wheel slip events may be characterized by extended wheel slip with a torque disturbance happening at 100 ms or longer, for example, after detection and which can vary in magnitude. In addition to long wheel slip events, rough road events may be indicated to the controller 12 as a number of bumps during a time frame. A bump may be defined as wheel slip that violates a calibratable threshold and then the magnitude of wheel slip diminishes under a calibratable threshold. After a calibratable number of bumps, the control system 10 will act in the same fashion as a long wheel slip event, which are both referred to herein as unreliable road conditions.

For both short and long wheel slip conditions the initial reaction may be the same, and the clamping force 526 may be increased to a level 528 at point C. However, in the alternative, for wheel slip events where wheel slip increases at a slow rate, the control system 10 can ramp up the minimum clamp force 526 to a table calculated value instead of setting minimum clamp force to level 528 immediately when the wheel slip magnitude threshold 504 is passed.

For unreliable road conditions, a table-based lookup can be implemented after the severity of the event has been determined. Thus, after the calibrated time 540 elapses, the control system 10 decreases the minimum clamp force 526 in section 527 at a predetermined rate. When the control system 10 detects that the event is not just transient, the control system 10 can set the clamp force 526 based on a table look up, at the level 529. This table look up can be based on the wheel slip magnitude, vehicle speed, input torque, throttle, acceleration, or a variety of other inputs, as described above. This reduces over-clamping, thus improving durability. Once the wheel slip conditions have subsided and the calibrated time 540 elapses, a calibration time window 531 sets the time for the control system 10 to hold the commanded clamp force 526 before it is decreased back to an input torque based minimum clamp force, at a predetermined rate as shown with sloped line 542. Thus, the substantial decrease of the clamp force 526 back to a minimum level does not occur until the calibrated holding time 540 elapses and the wheel slip magnitude 502 drops below the wheel slip magnitude threshold 504, which occurs after point D, and then an extra calibration 531 optionally elapses.

In some cases, the magnitude of wheel slip 502 may be so high as to exceed a separate severe threshold line 544. The severe threshold line 544 has an initial value 546 that is higher in magnitude than the wheel slip threshold 504 at both of its threshold values 534, 536. When the magnitude of wheel slip 502 exceeds the severe threshold line 544, it may be desirable to reduce the engine torque and the severe threshold 544. Thus, the severe threshold 554 is reduced to a level 547 when the wheel slip magnitude 502 exceeds the severe threshold 544. Near the bottom of graph 500, the engine torque ceiling is illustrated at plot line 548. When the wheel slip magnitude 502 exceeds the severe threshold line 544 at point E in section 550 of the wheel slip magnitude 502 profile, the engine torque ceiling 548 is commanded to produce no more torque than a level 552. Thus, the engine torque ceiling 548 is decreased from an initial level 554 to a lower level 552.

The actual engine torque, illustrated at plot line 558, normally tracks along the same as the possible engine torque 560, both of which are under the engine torque ceiling 548 under non-severe wheel slip conditions. When the engine torque ceiling 548 is reduced to level 552 in section 562, the possible engine torque 560 is then above the engine torque ceiling 548. Accordingly, the actual engine torque 558 must drop as shown at 558' to be equal to or less than the engine torque ceiling 548 in section 562. The lowered engine torque ceiling value 552 may be determined as a function of engine torque or driver demanded torque and wheel slip magnitude, by way of example. In the event of commanding a reduction of engine torque, the reduction is held until the wheel slip magnitude 504 drops below a calibrated hysteresis level and a predetermined timeframe 564 has elapsed. The engine torque ceiling 548 is then increased back to the maximum level 554, and therefore, the actual engine torque 558 is then increased back to the engine possible torque 560.

During variable mu events (i.e., changing road surface friction), the control system 10 may detect a series of large magnitude wheel slips. Once these events are over, wheel slip quickly decreases, which may cause an inertia spike in the CVT 140. On certain road conditions, this may continue to occur without exceeding the wheel slip threshold 504 between events. Each wheel slip event may occur for a shorter time than the debounce time 530, with more time than the debounce time 530 between each wheel slip event. In such cases, the control system 10 would not increase the clamp force 526 to level 528. Therefore, in such cases, the control system 10 may be configured to keep count of these wheel slip events, and if a certain number of these events occur, the clamp force 526 can be increased to a table look up value, such as the level 529, or the higher level 528. A separate calibratable exit time, potentially longer than calibration window 531, could be used as the new exit criteria. In addition to a longer exit time, the wheel slip threshold 504 may be reduced, such as to level 536. This can be done to avoid multiple clamp force disturbances and rapid changes in minimum clamp force, as such disturbances may interfere with ratio control.

The control system detection strategy of the control system 10 may be configured to identify any number of various disturbances, such as a generalized road disturbance, wheel slip magnitude or acceleration exceeding a threshold, a sudden deceleration of the vehicle, and/or a rolling change of direction of the vehicle, by way of example. The control system 10 may be further configured to detect a wheel slip event, or loss of wheel traction. A loss of wheel traction may include one or more of the following non-limiting events, such as a loss of wheel traction based on the wheel interaction with an ice, snow, gravel, or split friction surface. Such disturbances are shown as generally being detected in steps 204, 304, 404 to determine a resultant compensation strategy as described in the method blocks shown above.

Upon identification that the elevated or high compensation strategies should be implemented, for example, upon a wheel slip event exceeding a predetermined threshold, the control system 10 will implement the elevated or high compensation strategy to protect the variator assembly 30 of the CVT 140. The control system 10 may instruct the variator assembly 30 to overclamp (or clamp at a greater pressure) the belt 40. The control system 10 may adjust the clamping pressure being supplied to the pulleys 36, 38 to overclamp (or clamp at a greater pressure) the chain or belt 40 in order to protect the CVT 140. The adjusted variator torque capacity may be limited to a range biased higher than the initial variator torque capacity to avoid applying more torque at the wheels thereby exacerbating the traction event. The adjustment of the variator torque capacity and/or the clamping pressure in the CVT 140 may have a similar effect to a downshift in a step gear transmission to protect the CVT 140 from damage. The adjusted variator torque capacity or clamping pressure are transmitted to the CVT 140 to apply the desired adjustment to the clamping pressure and/or change in the variator torque capacity to the CVT 140.

The control system 10 may be configured to execute each of the steps illustrated in FIGS. 3-6. Thus, the entire description of FIGS. 3-6 may be applied to the control system 10 to effectuate the methods 200, 300, 400 and profile strategy shown in FIG. 6. Furthermore, the controller 12 may be or include a transmission controller that includes a number of control logics that are configured to execute the steps of the methods 200, 300, 400 or profile strategy in FIG. 6 explained above.

The controller 12 of the control system 10 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other examples for carrying out the claimed disclosure have been described in detail, various alternative designs and examples exist for practicing the disclosure defined in the appended claims. Furthermore, the examples shown in the drawings or the characteristics of various examples mentioned in the present description are not necessarily to be understood as examples independent of each other. Rather, it is possible that each of the characteristics described in one of the examples of an example can be combined with one or a plurality of other desired characteristics from other examples, resulting in other examples not described in words or by reference to the drawings. Accordingly, such other examples fall within the framework of the scope of the appended claims.

What is claimed is:

1. A method for controlling a continuously variable transmission (CVT) including a variator assembly for a motor vehicle, the method comprising:

commanding an initial minimum clamping pressure to be applied to the variator assembly to achieve a desired torque capacity;

determining at least one vehicle operation parameter;

determining a vehicle condition based on the at least one vehicle operation parameter, the vehicle condition being selectable from at least a first condition, a second condition, and a third condition;

selecting a compensation strategy based on the vehicle condition, the compensation strategy being selectable from at least a first compensation strategy, a second compensation strategy, and a third compensation strategy, the first compensation strategy being selected when the first condition has been determined, the second compensation strategy being selected when the second condition has been determined, and the third compensation strategy being selected when the third condition has been determined;

if the second compensation strategy has been selected and a predetermined condition has been met, commanding a second clamping pressure to be applied to the variator assembly; and if the third compensation strategy has been selected, commanding a third clamping pressure to be applied to the variator assembly.

2. The method of claim 1, further comprising commanding the initial minimum clamping pressure to be applied to the variator assembly if the first compensation strategy has been selected.

3. The method of claim 2, further comprising activating a timer if the second condition is determined, wherein in the second compensation strategy, the predetermined condition for commanding the second clamping pressure includes determining that the timer has reached a predetermined threshold.

4. The method of claim 3, the vehicle condition being further selectable from a fourth condition and a fifth condition, the compensation strategy being further selectable from a fourth compensation strategy and a fifth compensation strategy, the fourth compensation strategy being selected when the fourth condition has been determined, and the fifth compensation strategy being selected when the fifth condition has been determined;
if the fourth compensation strategy has been selected, commanding a fourth clamping pressure to be applied to the variator assembly and commanding a reduction in a maximum possible engine torque; and
if the fifth compensation strategy has been selected, commanding a fifth clamping pressure to be applied to the variator assembly.

5. The method of claim 4, wherein the step of determining the at least one vehicle operation parameter includes determining at least one of wheel slip magnitude, wheel slip acceleration, transmission output acceleration, longitudinal acceleration, latitudinal acceleration, and engine speed.

6. The method of claim 4, wherein the step of determining the at least one vehicle operation parameter includes determining wheel slip magnitude, the method including determining whether the wheel slip magnitude exceeds an initial wheel slip magnitude threshold for at least a predetermined duration, the method including selecting one of the second compensation strategy, the third compensation strategy, the fourth compensation strategy, and the fifth compensation strategy if the wheel slip magnitude exceeds the initial wheel slip magnitude threshold for at least the predetermined duration.

7. The method of claim 6, further comprising lowering the initial wheel slip magnitude threshold to a lowered wheel slip threshold if the one of the following clamping pressures is commanded to be applied to the variator assembly: the second clamping pressure, the third clamping pressure, the fourth clamping pressure, and the fifth clamping pressure.

8. The method of claim 7, wherein the fourth condition includes the wheel slip exceeding a predetermined wheel slip threshold, the predetermined wheel slip threshold being greater than the initial wheel slip magnitude threshold.

9. The method of claim 8, wherein the fifth condition includes at least one of the following: a predetermined number of bumps in a bump threshold timeframe; the wheel slip magnitude exceeding the initial wheel slip magnitude threshold for longer than a holding timeframe; and a predetermined number of wheel slip detections in a predetermined timeframe, the wheel slip detections being instances wherein the wheel slip magnitude exceeds the initial wheel slip magnitude threshold, and wherein the fifth clamping pressure is lower than the second clamping pressure.

10. The method of claim 9, wherein the fifth clamping pressure is determined based on at least the following criteria: wheel slip magnitude, vehicle speed, input torque, throttle input, and vehicle acceleration.

11. A transmission control system for controlling a continuously variable transmission (CVT) having a variator assembly, the transmission control system comprising an instruction set, the instruction set executable to:
command an initial minimum clamping pressure to be applied to the variator assembly to achieve a desired torque capacity;
determine at least one vehicle operation parameter;
determine a vehicle condition based on the at least one vehicle operation parameter, the vehicle condition being selectable from at least a first condition ("base condition"), a second condition ("elevated condition"), and a third condition ("high condition");
select a compensation strategy based on the vehicle condition, the compensation strategy being selectable from at least a first compensation strategy ("base compensation strategy"), a second compensation strategy ("elevated compensation strategy"), and a third compensation strategy ("high compensation strategy"), the base compensation strategy being selected when the base condition has been determined, the elevated compensation strategy being selected when the elevated condition has been determined, and the high compensation strategy being selected when the high condition has been determined;
if the elevated compensation strategy has been selected and a predetermined condition has been met, command a second clamping pressure ("elevated clamping pressure") to be applied to the variator assembly; and
if the high compensation strategy has been selected, command a third clamping pressure ("high clamping pressure") to be applied to the variator assembly.

12. The transmission control system of claim 11, the transmission control system being configured to command the initial minimum clamping pressure to be applied to the variator assembly if the base compensation strategy has been selected, the transmission control system further comprising a timer, the transmission control system being configured to activate the timer if the elevated condition is determined, wherein in the elevated compensation strategy, the transmission control system is configured to command the elevated clamping pressure when the timer has reached a predetermined threshold.

13. The transmission control system of claim 12, the vehicle condition being further selectable from a fourth condition ("severe condition") and a fifth condition ("an unreliable road condition"), the compensation strategy being further selectable from a fourth compensation strategy ("severe compensation strategy") and a fifth compensation strategy ("an unreliable road compensation strategy"), the severe compensation strategy being selected when the severe condition has been determined, and the unreliable road compensation strategy being selected when the unreliable road condition has been determined, the transmission control system being configured to command a fourth clamping pressure ("severe clamping pressure") to be applied to the variator assembly and command a reduction in a maximum possible engine torque if the severe compensation strategy has been selected, and the transmission control system being configured to command a fifth clamping pressure ("unreliable road clamping pressure") to be applied to the variator assembly if the unreliable road compensation strategy has been selected, the at least one vehicle operation parameter including at least one of wheel slip magnitude, wheel slip acceleration, transmission output acceleration, longitudinal acceleration, latitudinal acceleration, and engine speed.

14. The transmission control system of claim 12, wherein the at least one vehicle operation parameter includes wheel slip magnitude, the transmission control system being configured to determine whether the wheel slip magnitude exceeds an initial wheel slip magnitude threshold for at least a predetermined duration, the control system being configured to select one of the unreliable road compensation strategy, the elevated compensation strategy, the high compensation strategy, and the severe compensation strategy if the wheel slip magnitude exceeds the initial wheel slip magnitude threshold for at least the predetermined duration, the transmission control system being further configured to lower the initial wheel slip magnitude threshold to a lowered wheel slip magnitude threshold if the one of the following clamping pressures is commanded to be applied to the variator assembly: the unreliable road clamping pressure, the elevated clamping pressure, the high clamping pressure, and the severe clamping pressure.

15. The transmission control system of claim 14, wherein the severe condition includes the wheel slip magnitude exceeding a predetermined wheel slip threshold, the predetermined wheel slip threshold being greater than the initial wheel slip magnitude threshold.

16. The transmission control system of claim 15, wherein the unreliable road condition includes at least one of the following: a predetermined number of bumps in a bump threshold timeframe; the wheel slip magnitude exceeding the initial wheel slip magnitude threshold for longer than a holding timeframe; and a predetermined number of wheel slip detections in a predetermined timeframe, the wheel slip detections being instances wherein the wheel slip magnitude exceeds the initial wheel slip magnitude threshold, and wherein the unreliable road clamping pressure is lower than the elevated clamping pressure.

17. A transmission controller for controlling a continuously variable transmission (CVT) having a variator assembly, the transmission controller comprising:
a first control logic configured to command an initial minimum clamping pressure to be applied to the variator assembly to achieve a desired torque capacity;
a second control logic configured to determine at least one vehicle operation parameter;
a third control logic configured to determine a vehicle condition based on the at least one vehicle operation parameter, the vehicle condition being selectable from at least a first condition, a second condition, and a third condition;
a fourth control logic configured to select a compensation strategy based on the vehicle condition, the compensation strategy being selectable from at least a first compensation strategy, a second compensation strategy, and a third compensation strategy, the first compensation strategy being selected when the first condition has been determined, the elevated second compensation strategy being selected when the second condition has been determined, and the third compensation strategy being selected when the third condition has been determined;
a fifth control logic configured to command a second clamping pressure to be applied to the variator assembly if the second compensation strategy has been selected and a predetermined condition has been met; and a sixth control logic configured to command a third clamping pressure to be applied to the variator assembly if the third compensation strategy has been selected.

18. The transmission controller of claim 17, further comprising:
a seventh control logic configured to command the initial minimum clamping pressure to be applied to the variator assembly if the first compensation strategy has been selected;
a timer; and
an eighth control logic configured to activate the timer if the second condition is determined, the fifth control logic being further configured to command the second clamping pressure when the timer has reached a predetermined threshold.

19. The transmission controller of claim 18, the vehicle condition being further selectable from a fourth condition and a fifth condition, the compensation strategy being further selectable from a fourth compensation strategy and a fifth compensation strategy, the fourth control logic being further configured to select the fourth compensation strategy when the fourth condition has been determined and to select the fifth compensation strategy when the fifth condition has been determined, the transmission controller further comprising a ninth control logic configured to command a fourth clamping pressure to be applied to the variator assembly and command a reduction in a maximum possible engine torque if the fourth compensation strategy has been selected, and the transmission controller further comprising a tenth control logic configured to command a fifth clamping pressure to be applied to the variator assembly if the fifth compensation strategy has been selected, the at least one vehicle operation parameter including at least one of wheel slip magnitude, wheel slip acceleration, transmission output acceleration, longitudinal acceleration, latitudinal acceleration, and engine speed.

20. The transmission controller of claim 19, wherein the at least one vehicle operation parameter includes wheel slip magnitude, the transmission controller further comprising:
an eleventh control logic configured to determine whether the wheel slip magnitude exceeds an initial wheel slip magnitude threshold for at least a predetermined duration, the fourth control logic being further configured to select one of the second compensation strategy, the third compensation strategy, the fourth compensation strategy, and the fifth compensation strategy if the wheel slip magnitude exceeds the initial wheel slip magnitude threshold for at least the predetermined duration; and
a twelfth control logic configured to lower the initial wheel slip magnitude threshold to a lowered wheel slip magnitude threshold if the one of the following clamping pressures is commanded to be applied to the variator assembly: the second clamping pressure, the third clamping pressure, the fourth clamping pressure, and the fifth clamping pressure,
wherein the fourth condition includes the wheel slip magnitude exceeding a fourth threshold, the fourth threshold being greater than the initial wheel slip magnitude threshold,
wherein the fifth condition includes at least one of the following: a predetermined number of bumps in a bump threshold timeframe; the wheel slip magnitude exceeding the initial wheel slip magnitude threshold for longer than a holding timeframe; and a predetermined number of wheel slip detections in a predetermined timeframe, the wheel slip detections being instances wherein the wheel slip magnitude exceeds the initial wheel slip magnitude threshold, wherein the fifth clamping pressure is lower than the second clamping pressure, and wherein the fifth clamping pressure is determined based on at least the following criteria: wheel slip magnitude, vehicle speed, input torque, throttle input, and vehicle acceleration.

21. A continuously variable transmission (CVT) for a motor vehicle, comprising:

a variator assembly including a first pulley and a second pulley, the first and second pulleys rotatably coupled by a continuous rotatable device, wherein the first pulley is rotatably coupled to an input member and the second pulley is rotatably coupled to an output member;

the first pulley including a first moveable sheave that is translatable along a first axis relative to a first stationary sheave in response to urging of a first actuator;

the second pulley including a second moveable sheave that is translatable along a second axis relative to a second stationary sheave in response to urging of a second actuator; and a control system having at least one controller and one or more sensors in communication with the controller, the control system including an instruction set, the instruction set executable to:

command an initial minimum clamping pressure to be applied to the variator assembly to achieve a desired torque capacity;

determine at least one vehicle operation parameter;

determine a vehicle condition based on the at least one vehicle operation parameter, the vehicle condition being selectable from at least a first condition, a second condition, and a third condition;

select a compensation strategy based on the vehicle condition, the compensation strategy being selectable from at least a first compensation strategy, a second compensation strategy, and a third compensation strategy, the first compensation strategy being selected when the first condition has been determined, the second compensation strategy being selected when the second condition has been determined, and the third compensation strategy being selected when the third condition has been determined;

if the second compensation strategy has been selected and a predetermined condition has been met, command a second clamping pressure to be applied to the variator assembly; and if the third compensation strategy has been selected, command a third clamping pressure to be applied to the variator assembly.

22. The CVT of claim 21, the transmission control system being configured to command the initial minimum clamping pressure to be applied to the variator assembly if the first compensation strategy has been selected, the transmission control system further comprising a timer, the transmission control system being configured to activate the timer if the second condition is determined, wherein in the second compensation strategy, the transmission control system is configured to command the second clamping pressure when the timer has reached a predetermined threshold.

23. The CVT of claim 22, the vehicle condition being further selectable from a fourth condition and a fifth condition, the compensation strategy being further selectable from a fourth compensation strategy and a fifth compensation strategy, the fourth compensation strategy being selected when the fourth condition has been determined, and the fifth compensation strategy being selected when the fifth condition has been determined, the transmission control system being configured to command a fourth clamping pressure to be applied to the variator assembly and command a reduction in a maximum possible engine torque if the fourth compensation strategy has been selected, and the transmission control system being configured to command a fifth clamping pressure to be applied to the variator assembly if the fifth compensation strategy has been selected, the at least one vehicle operation parameter including at least one of wheel slip magnitude, wheel slip acceleration, transmission output acceleration, longitudinal acceleration, latitudinal acceleration, and engine speed.

24. The CVT of claim 23, wherein the at least one vehicle operation parameter includes wheel slip magnitude, the transmission control system being configured to determine whether the wheel slip magnitude exceeds an initial wheel slip magnitude threshold for at least a predetermined duration, the control system being configured to select one of the second compensation strategy, the third compensation strategy, the fourth compensation strategy, and the fifth compensation strategy if the wheel slip magnitude exceeds the initial wheel slip magnitude threshold for at least the predetermined duration, the transmission control system being further configured to lower the initial wheel slip magnitude threshold to a lowered wheel slip magnitude threshold if one of the following clamping pressures is commanded to be applied to the variator assembly: the second clamping pressure, the third clamping pressure, the fourth clamping pressure, and the fifth clamping pressure, wherein the fourth condition includes the wheel slip magnitude exceeding a predetermined wheel slip threshold, the predetermined wheel slip threshold being greater than the initial wheel slip magnitude threshold.

25. The CVT of claim 24, wherein the fifth condition includes at least one of the following: a predetermined number of bumps in a bump threshold timeframe; the wheel slip magnitude exceeding the initial wheel slip magnitude threshold for longer than a holding timeframe; and a predetermined number of wheel slip detections in a predetermined timeframe, the wheel slip detections being instances wherein the wheel slip magnitude exceeds the initial wheel slip magnitude threshold, and wherein the fifth clamping pressure is lower than the second clamping pressure.

* * * * *